US011758570B2

(12) United States Patent
Hakanson et al.

(10) Patent No.: US 11,758,570 B2
(45) Date of Patent: Sep. 12, 2023

(54) AUTOMATED INTERFERENCE MITIGATION IN FREQUENCY DIVISION DUPLEX (FDD) WIRELESS NETWORKS

(71) Applicant: Viavi Solutions, Inc., San Jose, CA (US)

(72) Inventors: Eric Walter Hakanson, Gilroy, CA (US); Jeffrey Abramson Heath, Jericho, NY (US)

(73) Assignee: Viavi Solutions, Inc., Chandler, AZ (US)

( * ) Notice: Subject to any disclaimer, the term of this patent is extended or adjusted under 35 U.S.C. 154(b) by 1189 days.

(21) Appl. No.: 16/382,020

(22) Filed: Apr. 11, 2019

(65) Prior Publication Data

US 2019/0320444 A1   Oct. 17, 2019

Related U.S. Application Data

(60) Provisional application No. 62/656,615, filed on Apr. 12, 2018.

(51) Int. Cl.
*H04W 72/541* (2023.01)
*H04W 72/0446* (2023.01)
(Continued)

(52) U.S. Cl.
CPC ............ *H04W 72/541* (2023.01); *H04L 5/14* (2013.01); *H04W 72/0446* (2013.01); *H04W 72/12* (2013.01)

(58) Field of Classification Search
CPC ... H04B 1/1027; H04B 1/525; H04W 72/541; H04W 72/12; H04W 72/0446; H04L 5/14
See application file for complete search history.

(56) References Cited

U.S. PATENT DOCUMENTS 8,855,580 B2 * 10/2014 Dent ..................... H04B 1/525
455/296
9,479,268 B2   10/2016 Guldberg
(Continued)

FOREIGN PATENT DOCUMENTS

| GB | 2485387 | 5/2012 |
| WO | WO2017006155 | 1/2017 |
| WO | WO2017157461 | 9/2017 |

*Primary Examiner* — Oussama Roudani
(74) *Attorney, Agent, or Firm* — Farjami & Farjami LLP

(57) ABSTRACT

A method is disclosed for use in a frequency division duplex (FDD) wireless network including a base station (BS) and a user equipment controller (UE) communicating through a medium having an uplink communication channel supporting communications from the UE to the BS, and a downlink communication channel supporting communications from the BS to the UE. The method includes identifying an uplink frequency spectrum in the uplink communication channel affected by an interfering signal, and determining the uplink power level of the interfering signal and whether the interfering signal is caused by passive intermodulation distortion (PIM). In response to determining that that the interfering signal is caused by PIM, the method includes adjusting, based on the uplink frequency spectrum and the uplink power level of the interfering signal, one or more of a downlink power level of a downlink transmission signal and a downlink frequency range in the downlink communication channel.

24 Claims, 12 Drawing Sheets

(51) Int. Cl.
*H04W 72/12* (2023.01)
*H04L 5/14* (2006.01)

(56) References Cited

U.S. PATENT DOCUMENTS

| | | | |
|---|---|---|---|
| 9,941,959 B2 | 4/2018 | Heath | |
| 2010/0225389 A1* | 9/2010 | Teetzel | H03F 3/211 |
| | | | 330/149 |
| 2011/0319120 A1* | 12/2011 | Chen | H04W 52/367 |
| | | | 455/522 |
| 2017/0047949 A1* | 2/2017 | Notargiacomo | H04B 1/0053 |
| 2017/0324485 A1* | 11/2017 | Patel | H04B 1/26 |
| 2018/0213557 A1* | 7/2018 | He | H04W 74/04 |
| 2018/0368077 A1* | 12/2018 | Laporte | H04W 52/52 |
| 2018/0368199 A1* | 12/2018 | Zeng | H04W 88/10 |
| 2019/0104457 A1* | 4/2019 | Lindoff | H04W 88/08 |
| 2020/0296729 A1* | 9/2020 | Lindoff | H04W 72/23 |

* cited by examiner

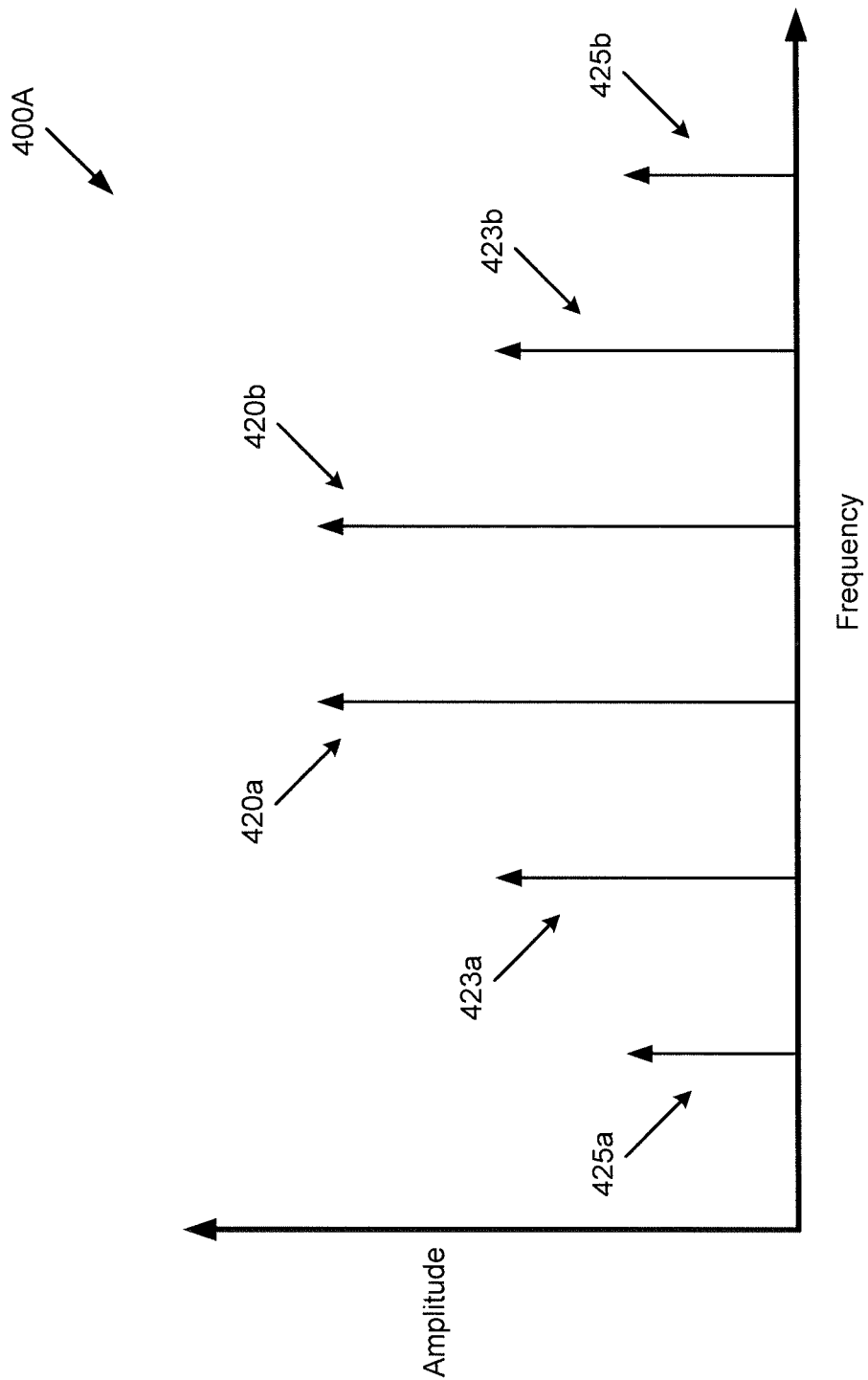

AUTOMATED INTERFERENCE MITIGATION IN FREQUENCY DIVISION DUPLEX (FDD) WIRELESS NETWORKS

RELATED APPLICATION(S)

The present application claims the benefit of and priority to Provisional Patent Application Ser. No. 62/656,615, filed Apr. 12, 2018, and titled "System and Methods for Automatic Interference Mitigation in LTE Networks," which is hereby incorporated fully by reference into the present application.

BACKGROUND

A significant cause of wireless network problems is interference. The most common sources of such interference are narrowband continuous wave (CW) signals, narrowband sweeping signals, and passive intermodulation distortion (PIM). Of these three interference sources, PIM is particularly problematic for frequency division duplex (FDD) wireless networks in which network base stations receive uplink signals (i.e., mobile device to base station signals) while concurrently transmitting downlink signals (i.e., base station to mobile device signals) at significantly greater power.

PIM is typically the result of non-linearities that cause the more powerful downlink signals to create interference in the base station receiver at the frequency for the weaker uplink signals. The effect of PIM is to reduce the signal-to-noise-plus-interference ratio (SINR) at the base station receiver. When PIM is sufficiently severe, reception at the base station receiver may not be possible during transmission by the base station transmitter. Consequently, there is a need in the art for an automated solution for identifying and mitigating sources of interference, including PIM, in FDD wireless networks.

SUMMARY

There are provided devices and methods for automating interference mitigation in frequency division duplex (FDD) wireless networks, substantially as shown in and/or described in connection with at least one of the figures, and as set forth more completely in the claims.

BRIEF DESCRIPTION OF THE DRAWINGS

FIG. 4A shows an exemplary diagram of PIM caused by two signals at different frequencies;

DETAILED DESCRIPTION

Figure 1:
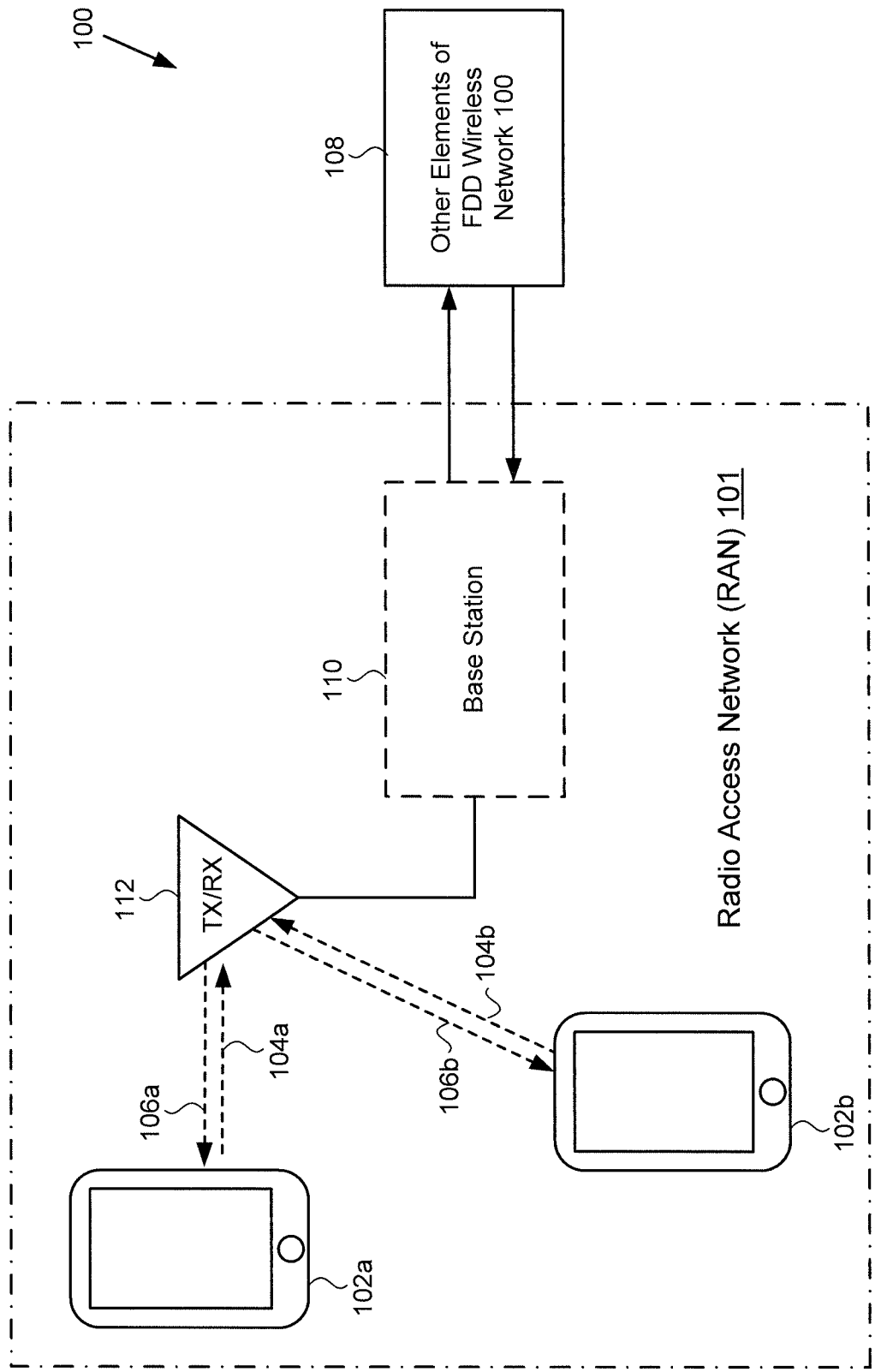
FIG. 1 shows a diagram illustrating communication among constituents of an exemplary frequency division duplex (FDD) wireless network, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

It is noted that, as used in the present application, the terms "automation," "automated", and "automating" refer to systems and processes that do not require human intervention. Although, in some implementations, a human wireless network controller may review or even modify the interference mitigation strategies generated by the automated devices and according to the automated methods disclosed herein, that human involvement is optional. Thus, the interference mitigation strategies described in the present application may be determined and implemented under the control of hardware processing components executing them.

FIG. 1 shows a diagram illustrating communication among constituents of exemplary frequency division duplex (FDD) wireless network 100, according to one implementation. In various implementations, FDD wireless network 100 may be implemented as a fourth generation wireless systems (4G) technology network utilizing a Long-Term Evolution (LTE) standard, or a fifth generation wireless systems (5G) technology network, for example.

As shown in FIG. 1, FDD wireless network 100 includes radio access network (RAN) 101 having base station (BS) 110 communicatively coupled with mobile communication devices 102a and 102b, shown as exemplary smartphones in FIG. 1 and typically referred to as "user equipment" or "UE" (hereinafter "UE 102a/102b"). As further shown in FIG. 1, communications between base station 110 and UE 102a/102b occurs via uplink transmission signals 104a and 104b, downlink transmission signals 106a and 106b, and via antenna 112 of base station 110 configured to transmit downlink transmission signals 106a and 106b as well as to receive uplink transmission signals 104a and 104b. Also shown in FIG. 1 is conceptual block 108 representing elements of FDD wireless network 100 other than RAN 101.

It is noted that although FIG. 1 shows a single instance of RAN 101 for conceptual clarity, FDD wireless network 100 would typically include many instances of RAN 101, each communicatively coupled to other elements 108 of FDD wireless network 100, as well as to other communication networks, such as the Internet and the Public Switched Telephone Network for example. Moreover, the base stations included in each RAN may be communicatively coupled to one another via a fiber optic communication network included in other elements 108 of FDD wireless network 100. In such an implementation, each separate link in a chain of communication between UE 102a/102b in RAN 101 and another UE in another RAN may take the form of one of uplink transmission signals 104a and 104b or downlink transmission signals 106a and 106b, fiber optic signals between base station 110 and other elements 108 of FDD wireless network 100, and fiber optic signals between nodes of the fiber optic network linking RAN 101 with another RAN and other networks. Nevertheless, FIG. 1 emphasizes RAN 101 because it is the RAN environment that is typically the limiting factor in the reliability of FDD wireless network 100.

In addition to reliability problems, there are also capacity constraints in the RAN environment. The capacity for data transfer (measured in bits per second) over a fiber optic line coupling base station 110 to other elements 108 of FDD wireless network 100, for example, is much greater than the data transmission capacity of RAN 101. In addition, frequency spectrum is a shared public resource that is regulated and controlled by government agencies. Due to the limited supply of frequency spectrum, and because of the growth in demand for wireless services by consumers, licensing costs are high, making frequency spectrum a costly investment for mobile service providers.

The performance of RAN 101 depends on the signal-to-noise ratio-plus-interference (SINR) at base station 110. SINR is defined as:

$$SINR = \frac{\text{signal power level}}{\text{interference} + \text{noise power level}}$$

As seen above, SINR decreases when signal power goes down, or when noise or interference goes up, and as a result, reliability, capacity, and data throughput all go down. With respect to SINR, the most challenged receiver in FDD wireless network 100 is the receiver of base station 110 that must recover uplink transmission signals 104a and 104b transmitted by UE 102a/102b. However, the transmit power of UE 102a/102b is typically low, and typically cannot be increased due to safety concerns and practical limitations on size and battery power.

Moreover, the uplink transmission signals 104a and 104b transmitted by UE 102a/102b are subject to conditions such as reflection, absorption, and scattering within the environment of RAN 101 that can only be predicted using statistical models. The interaction of such effects is termed "fading" and can result in temporary reductions of the uplink transmission signal level by factors of approximately ten to approximately one hundred. Consequently, FDD wireless network 100 may often operate near its reliable limits of transmission based on the SINR. If a connection between a transmitter of UE 102a/102b and a receiver of base station 110 is operating near that limit and interference or noise level rises, the radio link can become unusable, resulting in speech becoming garbled or in the communication being dropped entirely.

Figure 2:
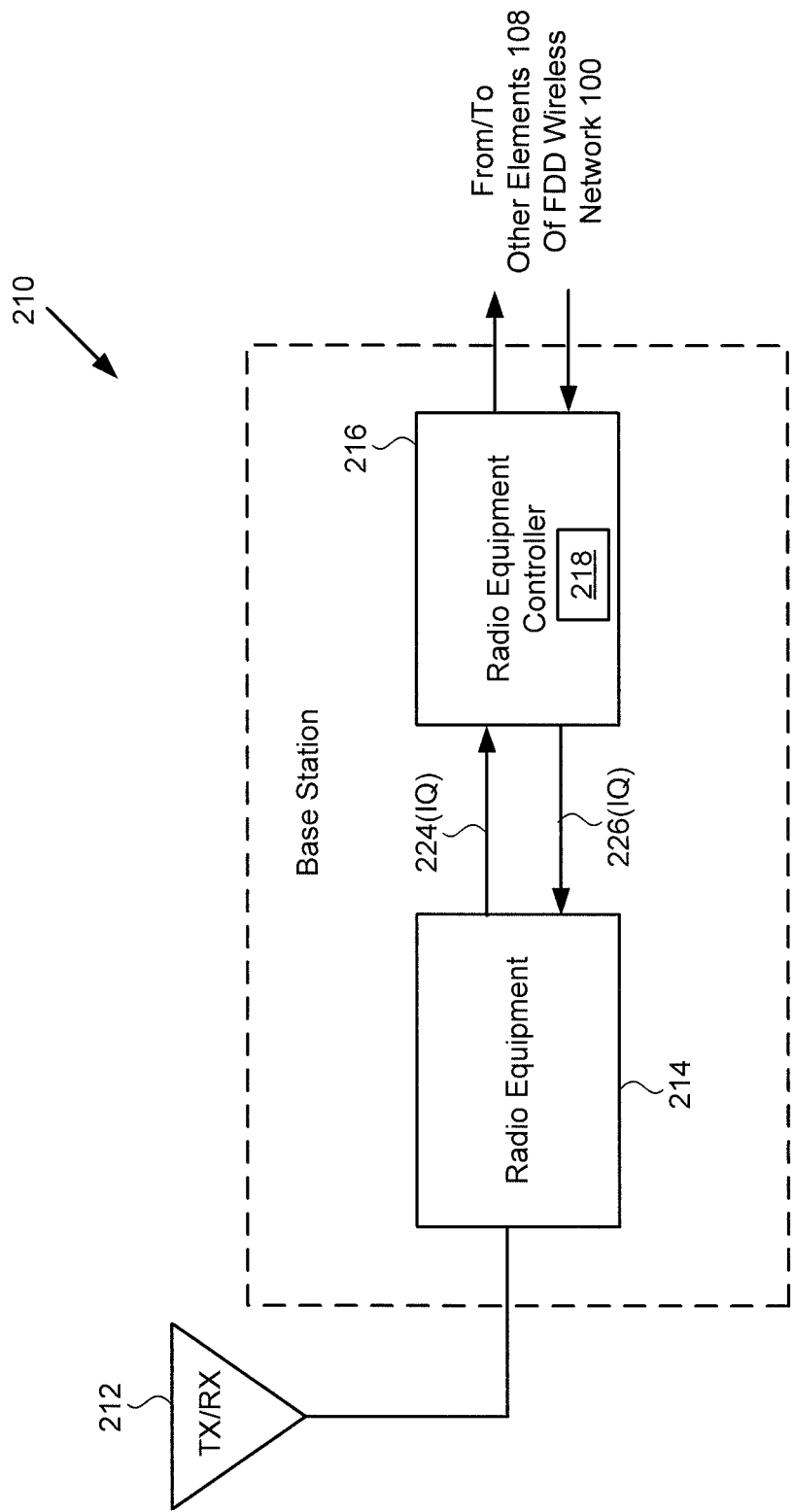
FIG. 2 shows a more detailed exemplary diagram of a base station including radio equipment (RE) and a radio equipment controller (REC) for use in the FDD wireless network of FIG. 1, according to one implementation.

FIG. 2 shows a more detailed exemplary diagram of base station 210 for use in FDD wireless network 100 in FIG. 1, according to one implementation. As shown in FIG. 2, base station 210 is communicatively coupled to other elements 108 of FDD wireless network 100, in FIG. 1. As further shown in FIG. 2, base station 210 includes transmit and receive antenna 212, radio equipment (RE) 214, and radio equipment controller (REC) 216 including scheduler 218. Also shown in FIG. 2 are uplink communication channel 224 supporting uplink data communications from RE 214 to REC 216, and downlink communication channel 226 supporting downlink data communications from REC 216 to RE 214.

Base station 210 having antenna 212 corresponds in general to base station 110 having antenna 112, in FIG. 1, and those corresponding features may share any of the characteristics attributed to either corresponding feature by the present disclosure. Thus, although not shown in FIG. 1, base station 110 may include features corresponding to RE 214, REC 216 including scheduler 218, uplink communication channel 224, and downlink communication channel 226. Moreover, uplink communication channel 224 is configured to communicate data received from UE 102/102b via uplink transmission signals 104a and 104b, in FIG. 1, while downlink communication channel 226 is configured to communicate data for transmission to UE 102a/102b via downlink transmission signals 106a and 106b.

It is noted that although in some implementations RE 214 and REC 216 may be integrated into a combined unit, RE 214 and REC 216 need not be co-located, and can in fact be separated by a considerable distance. For example, in some implementations, base station 110/210 may be situated in a single tower location. In those implementations, the RE 214 is typically mounted near the top of the tower while REC 216 may be ten or more meters away at the bottom of the tower. However, in other implementations, REC 216 may be situated together with other RECs in a central location remote from RE 214, and RE 214 may be connected to REC 216 over a distance of up to many kilometers.

RE 214 transmits downlink transmission signals 106a and 106b to UE 102a/102b and receives uplink transmission signals 104a and 104b from UE 102a/102b. RE 214 may include multiple transmitters and receivers at the same frequency, for diversity or for what is termed MIMO (Multiple Input Multiple Output) functionality. REC 216 processes the baseband modulation data in the mathematical format of I/Q vectors, where "I" represents the in-phase signal component and "Q" represents the quadrature phase signal component, as known in the art.

In the base station architecture shown in FIG. 2, REC 216 and RE 214 have digital data connections provided by uplink communication channel 224 and downlink communication channel 226 that can be extended up to many kilometers via highly reliable fiber optic connections. Uplink communication channel 224 and downlink communication channel 226 carry I/Q data providing a digital representation of the analog modulation included in uplink transmission signals 104a and 104b, and downlink transmission signals 106a and 106b, respectively. That is to say, the I and Q components of the uplink data carried by uplink communication channel 224 corresponds to communications from UE 102a/102b to base station 110/210.

In downlink communication channel 226, the I/Q data has no distortion because it has not been subjected to the effects of the environment of RAN 101, or to any other sources of distortion. However, in uplink communication channel 224, the I/Q data contains uplink transmission signals 104a and 104b created by UE 102a/102b as well as the environmental effects of RAN 101, e.g., path loss and fading effects, as well as distortion from interference sources.

As stated above, a significant cause of wireless network problems is interference in the form of narrowband continuous wave (CW) signals, narrowband sweeping signals, and passive intermodulation distortion (PIM). Of these three interference sources, PIM may be particularly problematic for FDD wireless network 100 in which RE 214 of base station 110/210 receives uplink radio signals 104a and 104b while concurrently transmitting downlink transmission signals 106a and 106b at significantly greater power. For example, in a 4G LTE wireless network, downlink transmission signals 106a and 106b may be up to approximately one hundred and thirty decibels (130 dB) stronger than uplink transmission signals 104a and 104b.

Figure 3:
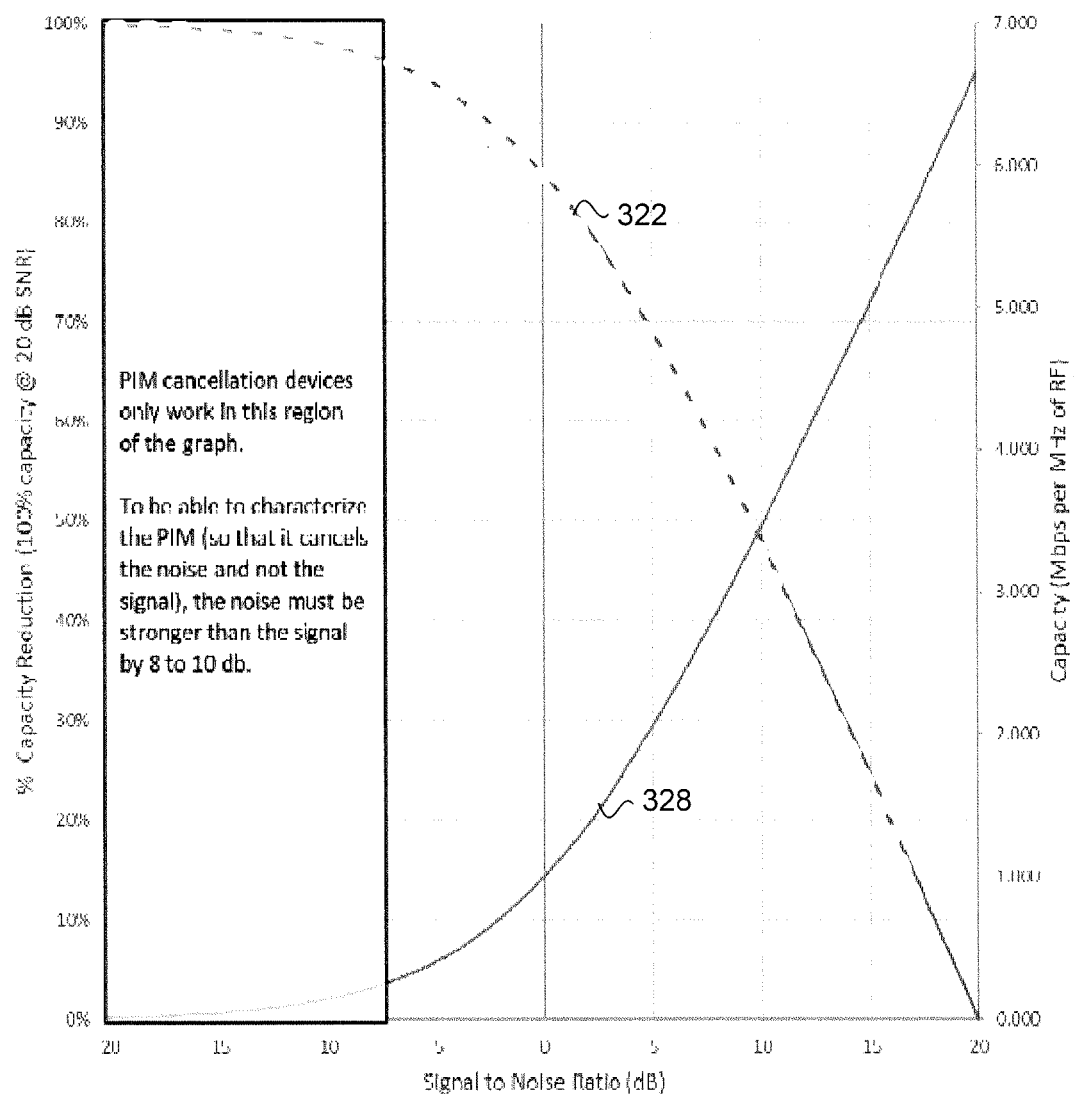
FIG. 3 shows an exemplary graph of the effects of passive intermodulation distortion (PIM) on signal-to-noise ratio-plus-interference (SINR) and capacity in an FDD wireless network.

As further stated above, PIM is typically the result of non-linearities that enable more powerful downlink transmission signals 106a and 106b to create interference in the receiver of RE 214 at the frequency for weaker uplink transmission signals 104a and 104b. The effect of PIM is to reduce the SINR at the receiver of RE 214. FIG. 3 shows exemplary graph 300 of the effects of PIM on the SINR and capacity in FDD wireless network 100. As shown by traces 322 and 328 in FIG. 3, reduction in SINR can severely limit the ability to receive signals.

The overall effect of PIM is to reduce the transmission capacity of RAN 101, as uplink transmission signals 104a and 104b from some of UEs 102a/102b can still be received by RE 214 of base station 110/210, but only UEs 102a/102b that are relatively close. UEs 102a/102b that are farther away from RE 214 may suffer a communication drop, slower data throughput, or even no data throughput at all. When PIM is sufficiently severe, reception at the receiver of RE 214 may not be possible during transmission by the transmitter of RE 214.

FIG. 4A shows exemplary diagram 400A of PIM caused by two signals at different frequencies. As shown in FIG. 4A, intermodulation (IM) causes input frequencies 420a and 420b to create other signals, i.e., IM products, at new frequencies. The frequency of these IM products depends on the frequencies of input signals 420a and 420b. The frequencies of the IM products can be predicted based on combinations of input frequencies 420a and 420b from transmitters of RE 214. For example, the frequency of IM product 425b may be three times the frequency of input signal 420b minus two times the frequency of input signal 420a (i.e., 3*420b−2*420a), while the frequency IM product 423a may be twice the frequency of input signal 420a minus the frequency of input signal 420b (i.e., 2*420a−420b).

It is noted that the sum of the numbers used to multiply the input frequencies 420a and 420b to produce an IM product is called the intermodulation order. Thus, IM product 425a is a fifth order (3+2) intermodulation signal, as is IM product 425b. By contrast IM product 423a is a third order intermodulation signal (2+1), as is IM product 423b. Although an infinite number of IM products can be defined, their amplitudes drop rapidly as their order increases, so that higher order IM products become insignificant.

Figure 4B:
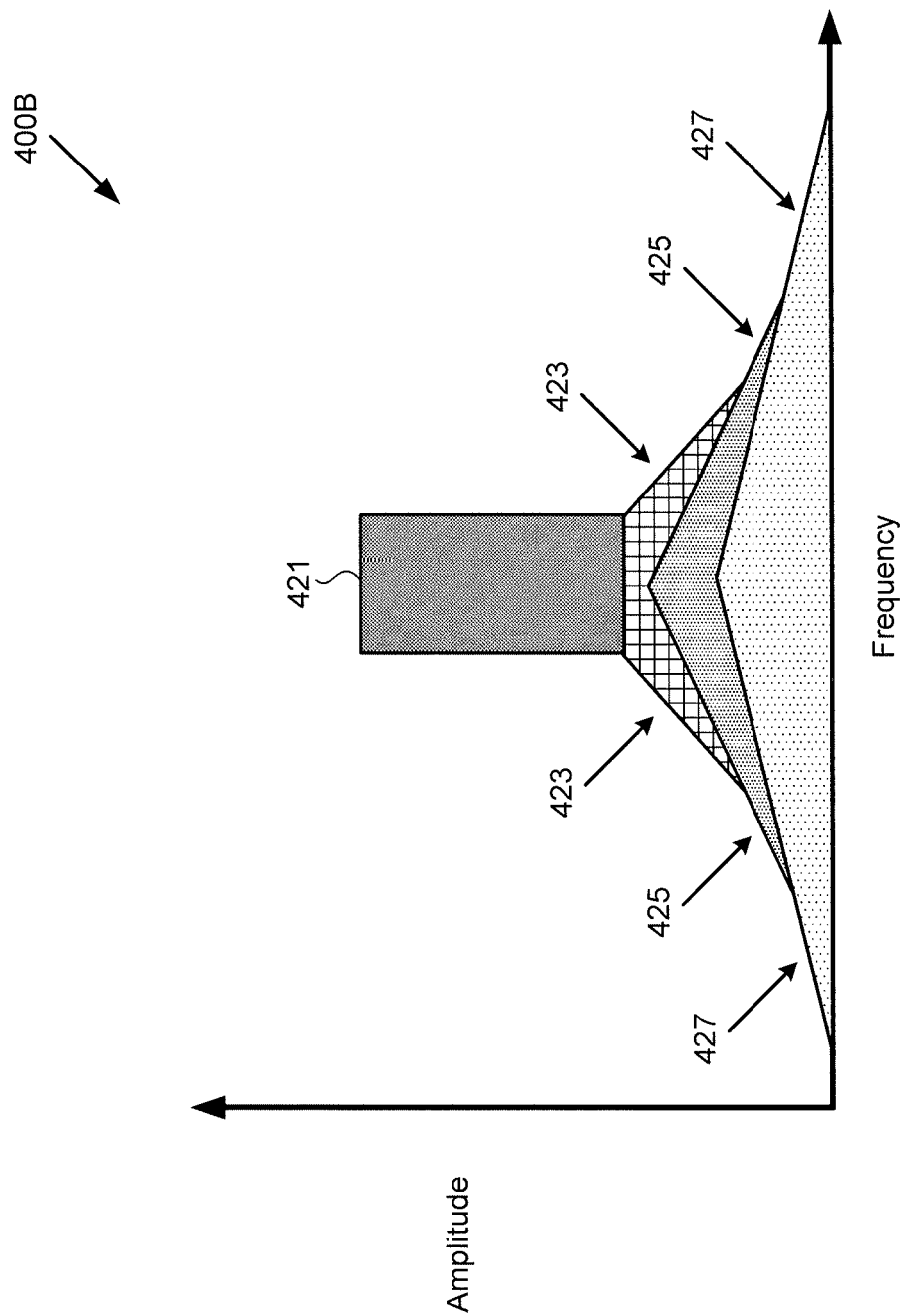
FIG. 4B shows an exemplary diagram of PIM caused by a single modulated signal.

Modulated signals can also cause PIM, and can generate IM products that typically have a larger frequency range than IM products resulting from non-modulated input signals. Also the frequency ranges of the IM products resulting from modulated signals get progressively wider as their order increases. Diagram 400B in FIG. 4B, depicts PIM caused by a single modulated signal. It is noted that PIM may be caused by a single modulated signal, or by multiple modulated signals.

PIM produced by single modulated signal 421 may be multiple signals that are close in frequency, or may be modeled as multiple signals that are close in frequency. In 4G LTE, for example, there are multiple subcarriers included as part of the transmitted 4G LTE signal. As shown in FIG. 4B, third order IM products 423, fifth order IM products 425, and seventh order IM products 427 from single modulated signal 421 are close in frequency to signal 421. Moreover, as their order increases, the frequency band of the IM products get wider and their power level reduces.

It is noted that the narrower the modulation of modulated input signal 421, the narrower the frequency ranges of the IM products are as well. In addition, reduction in the power of modulated input signal 421 results in the amplitudes of higher order IM products being reduced faster than the amplitude of modulated input signal 421. For example, if modulated input signal 421 is reduced by ten percent (10%) third order IM products 423 are reduced by approximately 27%, fifth order IM products 425 are reduced by approximately 41%, and seventh order IM products 427 are reduced by approximately 51%. It is further noted that the shapes of the IM products of modulated input signal 421 are not accurately depicted in FIG. 4B, but rather will gradually slope away in frequency from the frequency of modulated input signal 421.

One conventional approach to reducing the interference produced by PIM is through downlink power reduction. Because, as discussed above, the IM products reduce in power faster than the transmitted power, a small power reduction can help with PIM problems. Although effective in reducing PIM interference, reducing transmitted power also reduces the coverage of RAN 101. In some use cases the reduction in coverage can be compensated for by changing the tilt of antenna 112/212 and increasing power to adjacent wireless network cells. However, sometimes that conventional interference mitigation solution cannot be implemented, or does not provide adequate interference mitigation.

Figure 5A:
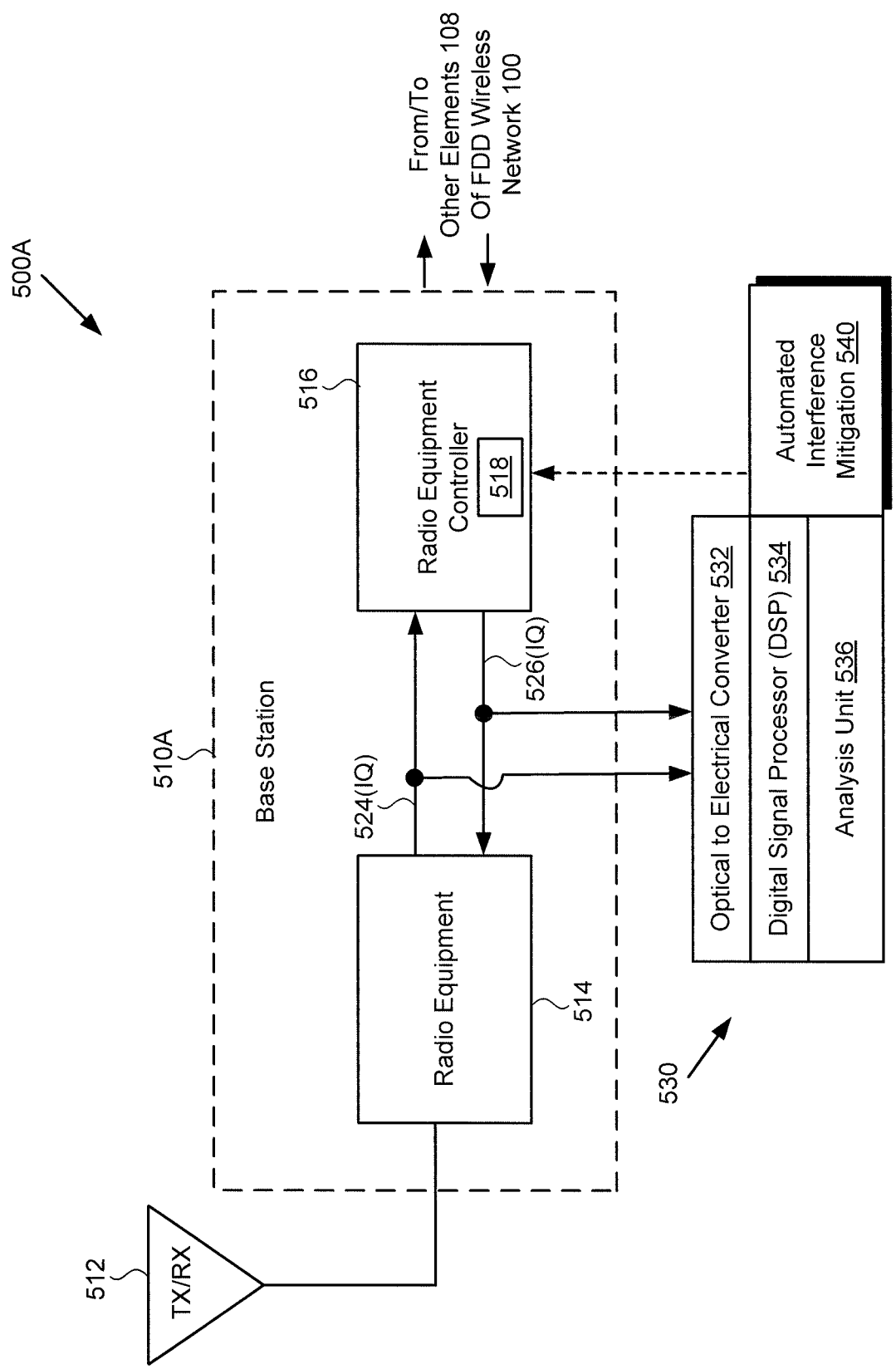
FIG. 5A shows a diagram of a radio base station communicatively coupled to a device configured to perform automated interference mitigation in the FDD wireless network of FIG. 1, according to one exemplary implementation.

FIG. 5A shows diagram 500A of base station 510A communicatively coupled to device 540 configured to perform automated interference mitigation in FDD wireless network 100, according to one exemplary implementation. As shown in FIG. 5A, base station 510A is communicatively coupled to other elements 108 of FDD wireless network 100, in FIG. 1, as well as to interference analyzer 530 and device 540 configured to provide automated interference mitigation for FDD wireless network 100. As further shown in FIG. 5A, base station 510A includes transmit and receive antenna 512, RE 514, and REC 516 including scheduler 518. Also shown in FIG. 5A are uplink communication channel 524 supporting uplink data communications from RE 514 to REC 516, and downlink communication channel 526 supporting downlink data communications from REC 516 to RE 514.

Base station 510A having antenna 512 corresponds in general to base station 110/210 having antenna 112/212, in FIGS. 1 and 2. That is to say, base station 110/210 may share any of the characteristics attributed to base station 510A by the present disclosure, and vice versa. Thus, RE 514, REC 516 including scheduler 518, uplink communication channel 524 and downlink communication channel 526, in FIG. 5A, correspond respectively in general to RE 214, REC 216 including scheduler 218, uplink communication channel 224 and downlink communication channel 226, in FIG. 2. In addition, and although not shown in FIG. 1, base station 110 may include features corresponding to RE 214/514, REC 216/516 including scheduler 218/518, uplink communication channel 224/524, and downlink communication channel 226/526.

Like RE 214, RE 514 transmits downlink transmission signal 106a and 106b to UE 102a/102b and receives uplink transmission signals 104a and 104b from UE 102a/102b. Also like RE 214, RE 514 may have multiple transmitters and receivers at the same frequency, for diversity or for MIMO functionality. Like REC 216, REC 516 processes the baseband modulation data in the mathematical format of I/Q vectors. As discussed above, in downlink communication channel 226/526, the I/Q data has no distortion because it has not yet been subjected to the effects of the environment of RAN 101 or to any other sources of distortion. However, in uplink communication channel 224/524, the I/Q data contains uplink transmission signals 104a and 104b created by UE 102a/102b plus the environmental effects of RAN 101, e.g., path loss and fading effects, as well as distortion from interference sources.

According to the exemplary implementation shown in FIG. 5A, device 540 may be co-located with or may be integrated with interference analyzer 530 and may be configured to use interference analyzer 530 to provide automated interference mitigation for base station 110/210/510A of FDD wireless network 100. Interference analyzer 530 monitors the communication between RE 214/514 and REC 216/516 by sampling data transferred via uplink communication channel 224/524 and downlink communication channel 226/526. That data is typically transferred over fiber optic connections, but other connections are possible, such as wireless connections, for example. Thus, the network medium having uplink communication channel 224/524 supporting uplink data communications from RE 214/514 to REC 216/516 and also having downlink communication channel 226/526 supporting downlink data communications from REC 216/516 to RE 214/514 may take the form of a fiber optic or other wired connection, or a wireless connection.

It is noted that the described monitoring of communication between RE 214/514 and REC 216/516 may be triggered by alarms from FDD wireless network 100, may be performed in response to an input by a network operator, or may be performed during automated scanning among the connections between REC 216/516 and RE 214/514.

In implementations in which the network medium having uplink communication channel 224/524 and downlink communication channel 226/526 is a fiber optic connection, the I/Q data sampled from uplink communication channel 224/524 and downlink communication channel 226/526 may be converted from optical format to electrical format. For example such a conversion may be performed using optical to electrical converter 532 of interference analyzer 530. The I/Q data in the electrical format may then be fed into high speed digital signal processor (DSP) 534.

DSP 534 of interference analyzer 530 may take the form of a Field Programmable Gate Array (FPGA) or Application Specific Integrated Circuit (ASIC), for example, configured to perform various operations to extract information about the performance of RAN 101. The data generated by DSP 534 may be passed to analysis unit 536 for additional processing, such as the automated analysis and identification of interference sources, as well as storage of I/Q data and traces for further analysis.

Figure 5B:
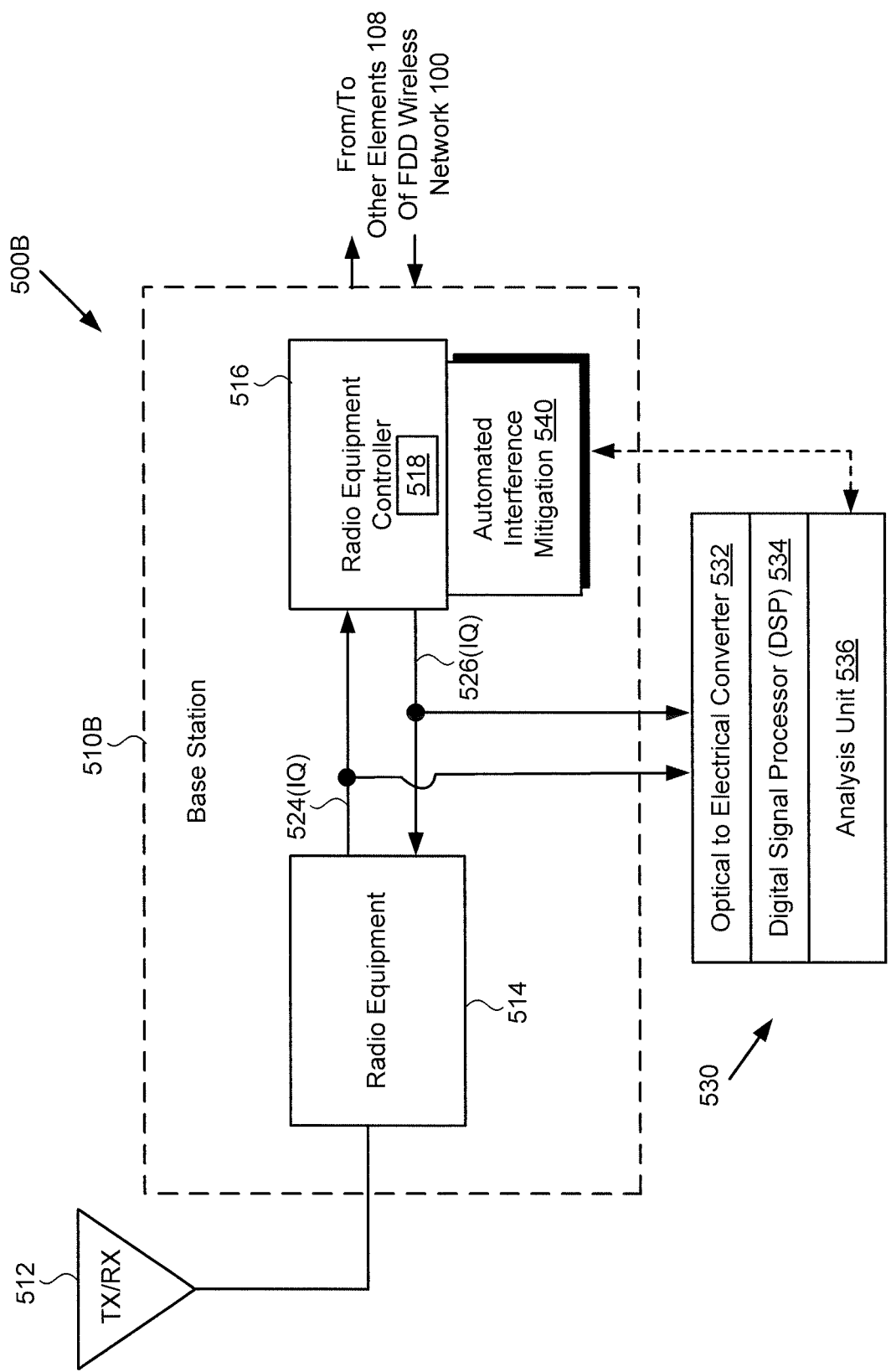
FIG. 5B shows a diagram of a radio base station communicatively coupled to a device configured to perform automated interference mitigation in the FDD wireless network of FIG. 1, according to another exemplary implementation.

FIG. 5B shows diagram 500B in which device 540 configured to perform automated interference mitigation in FDD wireless network 100 is co-located with or integrated with REC 216/516 of base station 510B, according to another exemplary implementation. It is noted that any feature in FIG. 5B identified by a reference number identical to one shown in FIG. 5A corresponds respectively to that previously described feature and may share any of the characteristics attributed to it by the present disclosure. Moreover, base station 510B corresponds in general to base station 510A, in FIG. 5A, as well as to base station 110/210 in FIGS. 1 and 2. That is to say, base station 510B may share any of the characteristics attributed to base station 110/210/510A by the present disclosure, and vice versa.

The implementation shown in FIG. 5B differs from the implementation shown in FIG. 5A with respect to the location and communicative coupling of device 540. In the implementation shown in FIG. 5A, device 540 is co-located with or integrated with interference analyzer 530 while being in remote communication with REC 216/516 of base station 110/210/510A. By contrast, in the implementation shown in FIG. 5B, device 540 is co-located with or integrated with REC 216/516 of base station 110/210/510B while being in remote communication with interference analyzer 530.

In either of the implementations shown in FIGS. 5A and 5B, and as discussed in greater detail below, device 540 may utilize interference analyzer 530 to determine and implement an interference mitigation strategy in an automated process. For example, device 540 may communicate with scheduler 218/518 of REC 216/516 to adjust the power, and/or bandwidth, and/or timing of downlink signals transmitted in downlink communication channel 226/526, i.e., signals for producing downlink transmission signals 106a and 106b by RE 214/514, in order to reduce or otherwise mitigate interference resulting from PIM, narrowband CW signals, or narrowband sweeping signals.

Figure 6:
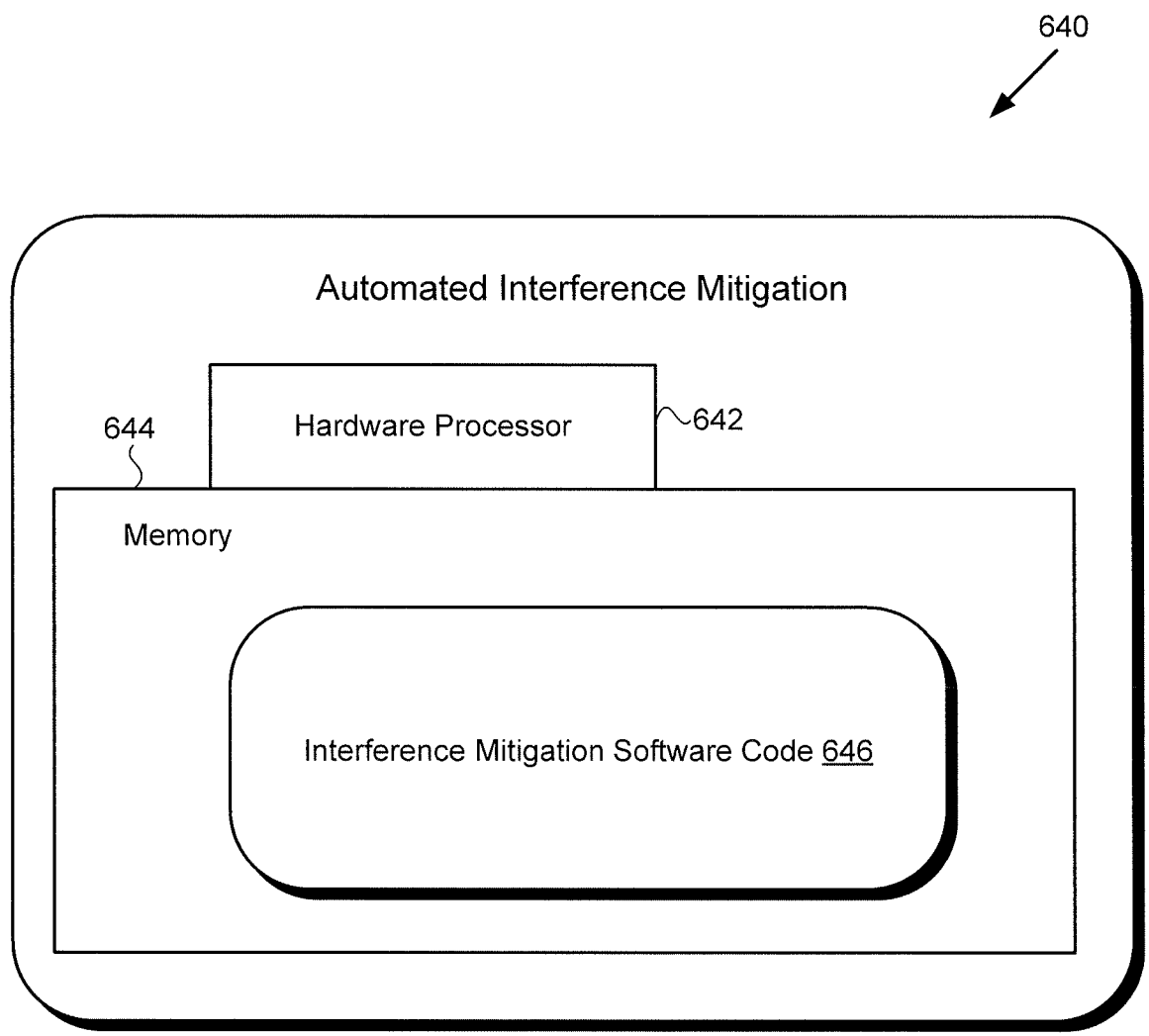
FIG. 6 shows an exemplary diagram of the device configured to perform automated interference mitigation shown in FIGS. 5A and 5B, according to one implementation.

FIG. 6 shows an exemplary diagram of the device configured to perform automated interference mitigation shown in FIGS. 5A and 5B, according to one implementation. As shown in FIG. 6, device 640 includes hardware processor 642 and memory 644 implemented as a non-transitory storage medium. As further shown in FIG. 6, memory 644 stores interference mitigation software code 646, which, when executed by hardware processor 642 of device 640, instantiates a method for performing automated interference mitigation in FDD wireless network 100.

Device 640 corresponds in general to device 540, in FIGS. 5A and 5B. That is to say, device 640 may share any of the characteristics attributed to device 540 by the present disclosure, and vice versa. Thus, although not shown in FIGS. 5A and 5B, device 540 may include features corresponding respectively to hardware processor 642, memory 644, and interference mitigation software code 646.

It is noted that, although the present application refers to interference mitigation software code 646 as being stored in memory 644 of device 540/640 for conceptual clarity, more generally, memory 644 may take the form of any computer-readable non-transitory storage medium. The expression "computer-readable non-transitory storage medium," as used in the present application, refers to any medium, excluding a carrier wave or other transitory signal that provides instructions to a hardware processor, such as hardware processor 642 of device 540/640. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Figure 7:
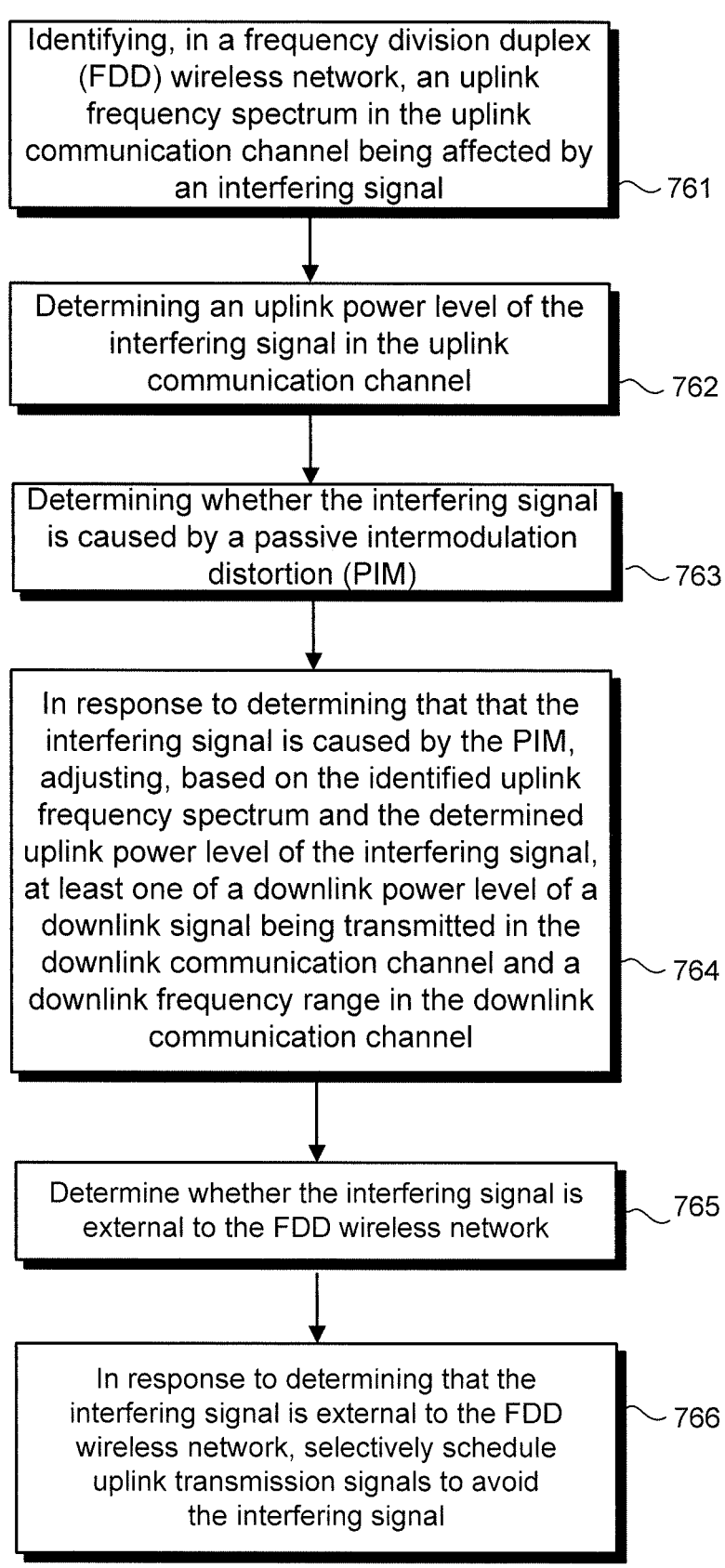
FIG. 7 shows a flowchart presenting an exemplary method for use in FDD wireless network 100 for automating interference mitigation, according to one implementation.

The functionality of device 540/640 will be further described by reference to FIG. 7 in combination with FIGS. 1, 2, 5A, 5B, and 6. FIG. 7 shows flowchart 760 presenting an exemplary method for use in FDD wireless network 100 for automating interference mitigation, according to one implementation. With respect to the method outlined in FIG. 7, it is noted that certain details and features have been left out of flowchart 760 in order not to obscure the discussion of the inventive features in the present application.

Referring now to FIG. 7 in combination with FIGS. 1, 2, 5A, 5B, and 6, flowchart 760 begins with identifying an uplink frequency spectrum in uplink communication channel 224/524 having transmission signal 104a and/or 104b that is being affected by an interfering signal (action 761). Identification of the uplink frequency spectrum in uplink communication channel 224/524 having transmission signal 104a and/or 104b that is being affected by the interfering signal may be performed by interference mitigation software code 646, for example, executed by hardware processor 642 of device 540/640, and using interference analyzer 530.

As discussed above, uplink communication channel 224/524 and downlink communication channel 226/526 carry I/Q data providing a digital representation of the analog modulation included in uplink transmission signals 104a and 104b, and downlink transmission signals 106a and 106b, respectively. The I/Q data sampled from uplink communication channel 224/524 and downlink communication channel 226/526 may be fed into DSP 534, which can perform various operations to extract information about the performance of RAN 101, including identifying the uplink frequency spectrum being affected by the interfering signal. Thus, identifying the uplink frequency spectrum in uplink communication channel 224/524 having transmission signal 104a and/or 104b that is being affected by the interfering signal can be based on I and Q components of the uplink data communications from RE 214/514 to the REC 216/516, i.e., the I and Q components within a receiver of base station 110/210/510A/510B.

Flowchart 760 continues with determining an uplink power level of the interfering signal in uplink communication channel 224/524 having transmission signal 104a and/or 104b (action 762). Determination of the uplink power level of the interfering signal in uplink communication channel 224/524 having transmission signal 104a and/or 104b may be performed by interference mitigation software code 646, executed by hardware processor 642 of device 540/640, and using interference analyzer 530. For example, the data generated by DSP 534 as part of action 761 may be passed to analysis unit 536 of interference analyzer 530 for additional processing, which may include determination of the uplink power level of the interfering signal.

Flowchart 760 continues with determining whether the interfering signal is caused by PIM (action 763). As discussed above, PIM can be especially problematic as an interference source in FDD wireless network 100. Moreover, in some cases, the effects of PIM in FDD wireless network 100 can be dynamic. That is to say, PIM levels can change with time, and in some cases change rapidly due to environmental changes such as wind or changes in sunlight due to clouds. Consequently, the real-time measurement of the PIM level can facilitate using the available transmission capability optimally to mitigate PIM at each moment in time.

A solution enabling real-time identification and measurement of PIM is disclosed in U.S. Pat. No. 9,941,959, titled "Method and Apparatus for the Detection of Distortion or Corruption of Cellular Communication Signals", and issued on Apr. 10, 2018, which is hereby incorporated fully by reference into the present application. Action 763 may be performed by interference mitigation software code 646, executed by hardware processor 642 of device 540/640, and using interference analyzer 530 and the solution disclosed by U.S. Pat. No. 9,941,959.

Real-time measurement of PIM can be important because if PIM is small, little or no mitigation may be necessary. By contrast, if PIM is severe, more aggressive mitigation techniques are typically required. In the process of measuring PIM, access to downlink transmission signals 106a and 106b transmitted by RE 214/514 and uplink transmission signals 104a and 104b received by RE 214/514 can be very helpful, and in some cases may be necessary. It is noted that PIM may be measured or estimated in a variety of ways.

For example, if there are no transmissions by UE 102a/102b, it may be relatively easy to correlate the uplink signal level seen in uplink communication channel 224/524 with the power transmitted in downlink communication channel 226/526. The absence of transmissions by UE 102a/102b could be the result of REC 216/516 causing scheduler 218/518 to not schedule such transmissions during a particular time interval. In a 4G LTE wireless network, for example, such scheduling would result in only relatively rare physical random access channel (PRACH) transmissions as well as transmission of small signals intended to be received by neighboring cells during that scheduling interval.

If it is necessary to have transmissions by UE 102a/102b and PIM is very high, it may also be relatively easy to determine the level of PIM. However, that set of circumstances is undesirable because RE 214/514 may be rendered substantially unable to detect transmissions by UE 102a/102b.

Measurement of PIM is more challenging and complex if PIM is low and many transmissions by UE 102a/102b are occurring. Those circumstances might by present, for example, after a PIM mitigation strategy has been applied, or as a way to monitor the level of PIM before it becomes too large. In those cases, the PIM level may be measured by correlating uplink transmission signal 104a and 104b signal with a mathematical model of PIM applied to downlink transmission signals 106a and 106b.

In that case, the processing gain of the correlation can be used to extract an estimate of the level of PIM. That is to say, the correlation will vary with the level of uplink transmission signals 104a and 104b as well as the PIM level, and the total signal level (mostly transmissions by UE 102a/102b+ PIM) is easy to measure. As a result, an estimate of the PIM level can be achieved by measuring those two quantities. If the correlation is high, almost all of the uplink power is coming from PIM. However, if the correlation is low, nearly none of the uplink power is coming from PIM.

Flowchart 760 continues with, in response to determining that that the interfering signal is caused by PIM, adjusting, based on the uplink frequency spectrum of the interfering signal identified in action 761 and the uplink power level of the interfering signal determined in action 762, one or more of a downlink power level of a downlink signal being transmitted in downlink communication channel 226/526 and a downlink frequency range in downlink communication channel 226/526 (action 764).

In situations in which PIM is severe, scheduler 218/518 of REC 216/516, which decides when downlink transmission signals 106a and 106b and uplink transmission signals 104a and 104b are to be transmitted, could reduce transmissions in the downlink to allow better reception for uplink transmission signals 104a and 104b. Such a reduction of downlink transmissions could occur in several ways in addition to simply reducing downlink transmission power.

For example, a reduction in downlink transmissions can be the result of scheduling no transmissions at all during intermittent time intervals. In a 4G LTE wireless network, for instance, such intermittent time intervals may correspond to LTE downlink subframes, while in a 5G wireless network such intermittent time intervals may be measured as slots. This interference mitigation strategy would cause FDD wireless network 100 to operate more like a time division duplex (TDD) wireless network. It is noted that there would typically be some power transmitted even during the time intervals when no transmissions are scheduled due to needed control channels, but those transmissions would be at substantially lower power levels. This interference mitigation solution allows RE 214/514 to receive more transmissions by UE 102a/102b, due to much lower PIM levels during the intermittent time intervals when no transmissions are scheduled.

Thus, in some implementations, in response to determining that that the interfering signal is caused by PIM, the downlink signal being transmitted in downlink communication channel 226/526 may be substantially minimized during multiple intermittent time intervals by scheduling no downlink signal transmission during those intermittent time intervals. Moreover, where FDD wireless network 100 is a 4G LTE network, substantially minimizing the downlink signal being transmitted in downlink communication channel 226/526 during the multiple intermittent time intervals may be the result of scheduling no downlink signal transmission during some LTE downlink subframes.

As another example, a reduction in downlink transmissions can result from reducing the downlink frequency range of the downlink signal being transmitted in downlink communication channel 226/526, which makes the intermodulation order needed for an IM product to appear in uplink communication channel 224/524 higher, thereby tending to reduce the level of PIM as can be seen from FIGS. 4A and 4B. In the case of 4G LTE, for example, the modulation bandwidth can be made narrower by scheduling no transmissions for some of the 4G LTE resource blocks (RBs), e.g., the outermost resource blocks, which are units of time and frequency used for scheduling downlink transmissions.

Figure 8A:
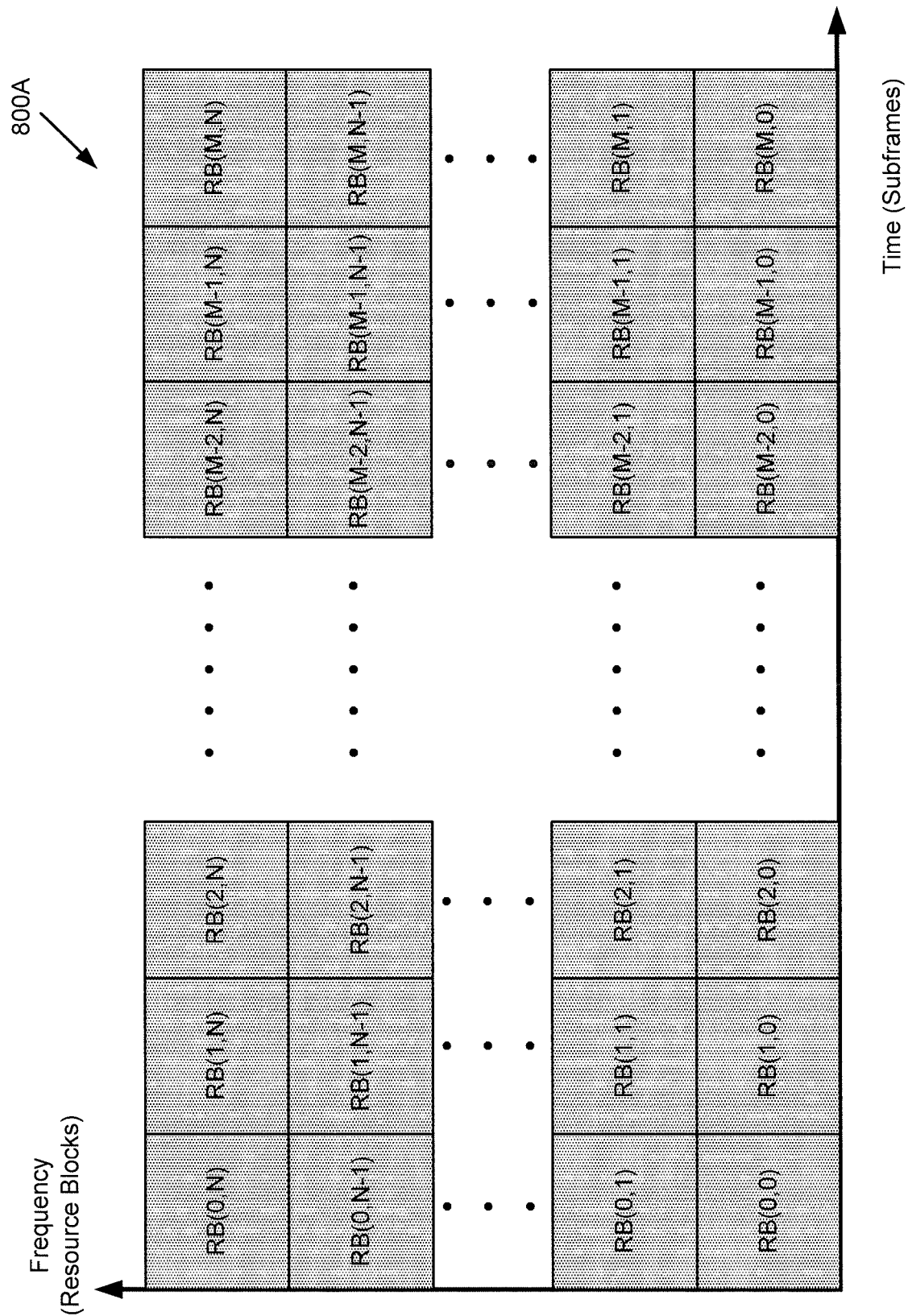
FIG. 8A shows exemplary resource blocks (RBs) of a downlink signal, according to one implementation.

FIG. 8A shows exemplary RBs 800A of a downlink signal, according to one implementation. As shown by FIG. 8A, the spectrum of downlink transmission RBs 800A includes RB(0,0), RB(1,0), RB(0,1), RB(1,1) RB(2,0), RB(2,1) . . . , RB(M-2,N-1), RB(M-1,N-1), RB(M-2,N), RB (M-1,N), RB(M,N-1), and RB(M,N) (hereinafter "downlink transmission RB(0,0)–RB(M,N)"), where "M" is an integer identifying the 4G LTE subframe or 5G slot, and "N" is an integer identifying a 4G LTE or 5G subband. As a specific example, in 4G LTE, each of downlink transmission RB(x,0)–RB(x,N) may include twelve 4G LTE subcarriers having a frequency range of fifteen kilohertz (15 kHz) each, where "x" may assume any integer value from zero to M, inclusive. Thus, each of downlink transmission RB(x,0)–RB(x,N) may correspond to a frequency range of 180 kHz.

Figure 8B:
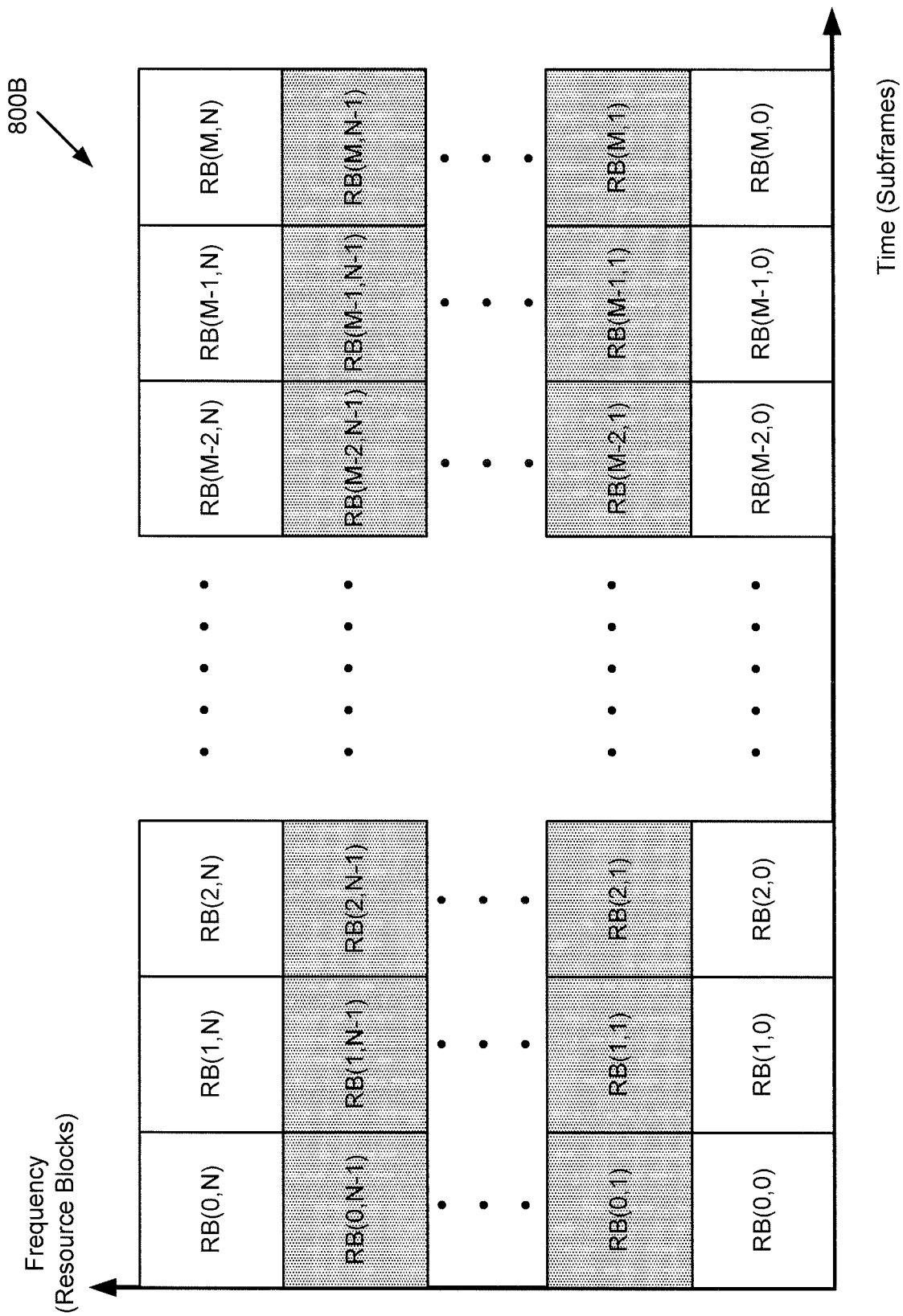
FIG. 8B shows the effects of one exemplary solution for mitigating to interference in an FDD wireless network on the RBs shown in FIG. 8A.

Under normal operating conditions, that is to say low or negligible PIM or other network interference, the power allocated to each of downlink transmission RB(0,0)–RB(M, N) may be substantially equal, as shown by the uniform shading of downlink transmission RB(0,0)–RB(M,N) in FIG. 8A. However, and as noted above, the modulation bandwidth of downlink transmissions can be made narrower by scheduling no transmissions for some of the outermost frequencies of downlink transmission RB(0,0)–RB(M,N). For example, referring to RBs 800B, in FIG. 8B, the number of downlink transmission RBs used by RE 214/514 to transmit downlink transmission signals 106a and 106b may be reduced by scheduling no transmissions for downlink transmission RB(x,0) and RB(x,N), where again "x" may assume any integer value from zero to M, inclusive thereby restricting downlink transmission to RB(0,1)–RB(M,N-1), and thereby also reducing downlink power level.

This reduces the bandwidth of the IM products as well as reducing the bandwidth of desired downlink transmission signals 106a and 106b. Because the lowest order IM product at the frequency of uplink transmission signals 104a and 104b (i.e., the strongest IM product at that frequency) comes from the highest and lowest frequencies in downlink transmission signals 106a and 106b, not scheduling a few of the highest frequency and/or lowest frequency downlink transmission RBs (i.e., turning them off, or nearly so) results in only higher order IM products being present in the uplink frequency range. Since higher order IM products are lower in power than lower order IM products, the level of PIM should be reduced.

Thus, in some implementations, in response to determining that the interfering signal is caused by PIM, adjusting the power level of the downlink signal being transmitted in downlink communication channel 226/526 may include reducing the number of downlink transmission RBs used by RE 214/514 to transmit downlink transmission signals 106a and 106b. In addition, or alternatively, in response to determining that the interfering signal is caused by PIM, adjusting the downlink frequency range of the downlink signal being transmitted in downlink communication channel 226/526 may include turning off one or more downlink transmission RBs at an extreme frequency of the downlink frequency range.

In choosing what downlink transmission RBs to not schedule, it may be more effective to choose downlink transmission RBs that are closest to the frequency of uplink transmission signals 104a and 104b. This is due to the mathematical relationship amongst the respective frequencies of the IM products. For example, referring to FIG. 4A, if the IM product comes from 2*420b-420a, a reduction in signal 420b (from not scheduling those downlink frequency RBs for transmission) reduces the highest frequency of IM twice as fast as increasing signal 420a. Not scheduling those downlink frequency RBs may also reduce the overall transmission power somewhat, additionally reducing the PIM problem, while still enabling the transmission of significant information.

Alternatively, the power to the scheduled downlink transmission RB(0,1)–RB(M,N-1) can be increased somewhat, allowing a higher modulation and coding scheme (MCS) for downlink transmissions. Those transmissions can be of either data or control signals. Both data transmissions and most of the control signals in 4G LTE, for example, (everything except the Reference Signal or RS) can be scheduled away from the outermost downlink transmission RBs when necessary. It may even be possible to reduce the power of the RS in those downlink transmission RBs as well. A simple but inefficient way to reduce downlink frequency range is to change the nominal channel bandwidth of downlink operation, such as from 20 MHz to 15 MHz for example. Although reducing downlink frequency range in this way has the added benefit of not transmitting any RS, it is typically less efficient than turning off a few downlink transmission RBs. Nevertheless, this simple but generally inefficient technique may be advantageous or desirable in some extreme situations.

Figure 8C:
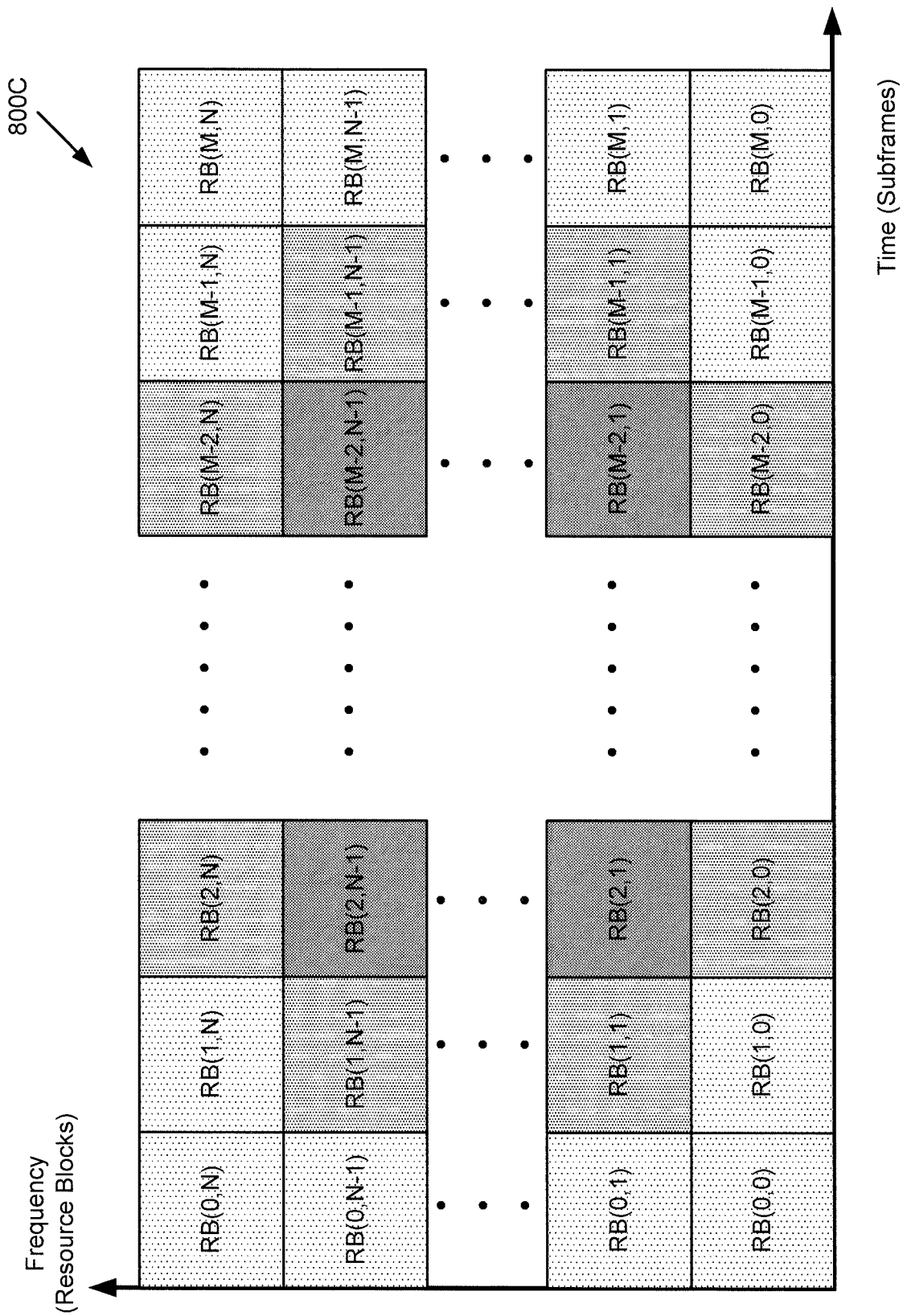
FIG. 8C shows the effects of another exemplary solution for mitigating interference in an FDD wireless network on the RBs shown in FIG. 8A.

In some cases, it may be advantageous or desirable to vary the power of different downlink transmission RBs. REC 216/516 could lower the power to some downlink transmission RBs, i.e., downlink transmission RB(0,0), RB(1,0), RB(0,1), RB(M−1,0), RB(M,0), RB(M,1), RB(0,N−1), RB(0,N), RB(1,N), RB(M,N−1), RB(M−1,N), and RB(M, N), as shown by RBs 800C, in FIG. 8C, and only use those downlink transmission RBs to transmit to UEs 102a/102b that are close to RE 214/514. Meanwhile the innermost downlink transmission RBs, i.e., downlink transmission RB(2,1)–RB(M−2,N−1) could be transmitted at higher power, potentially allowing transmissions to UE 102a/102b that are farther away, or using higher MCS for faster throughput. Thus, in some implementations, in response to determining that the interfering signal is caused by PIM, adjusting the power level of the downlink signal being transmitted in downlink communication channel 226/526 may include decreasing the power level of some downlink transmission RBs relative to other downlink transmission RBs.

The scheduling of downlink transmissions can also be dynamically adjusted, both in power and bandwidth, depending on the need for uplink transmissions and the level of PIM. For example, if no uplink transmissions are needed, the downlink can be scheduled for full bandwidth at full power, while if many uplink transmissions are needed, the downlink can be reduced in power, bandwidth, or both.

The scheduling for PIM reduction can also be refined by knowledge of the transmission channel for different UEs 102a/102b. There are several possible sources for this information. For example, UE 102a/102b can transmit reference signals for measuring the transmission channel. Some UEs need to transmit at higher power or with a lower MCS, as controlled by REC 216/516. REC 216/516 may also control the timing advance of UE 102a/102b, which gives a coarse measure of the distance from UE 102a/102b to RE 214/514 since transmitted signals reduce in amplitude approximately as a function of the distance squared. This estimated distance of UE 102a/102b from RE 214/514 provides a rough prediction of the transmission difficulty of UE 102a/102b to RE 214/514. As a result, and because as discussed above PIM does not affect the entire uplink frequency range equally, UE 102a/102b with a more difficult transmission channel could be scheduled to transmit using portions of the uplink frequency range that are less affected by PIM, i.e., typically frequencies that are farther away from the frequency of downlink transmission signal 106a and 106b. A further refinement may be necessary in use cases in which RE 214/514 is required to transmit acknowledgements of reception. In severe cases of PIM even this small transmission could cause problems in uplink reception. One interference mitigation strategy for addressing the problems introduced by the requirement of reception acknowledgements is to schedule downlink transmission at the same times (e.g., in the same 4G LTE subframe) as transmission of reception acknowledgements.

An additional challenge arises because some transmissions from UE 102a/102b are unscheduled and therefore not entirely controlled by REC 216/516. Nevertheless, REC 216/516 may be able to exercise some control over such unscheduled transmission from UE 102a/102b. In 4G LTE, for example, there is a configuration index (CI) for the PRACH mentioned above, which can limit when unscheduled transmissions by UE 102a/102b are sent. By using a CI that invokes some limits on these unscheduled transmissions, and taking account of those limits when scheduling for reduced PIM, the problems that can potentially arise due to unscheduled transmissions from UE 102a/102b can be avoided.

In addition, the frequency of the transmission for the PRACH can be controlled by the CI. Since PIM often has a significant slope across the uplink frequency range, having the PRACH be transmitted on the frequency with lower PIM can help. Moreover, various combinations of the interference mitigation strategies described above are also possible, such as reducing the downlink frequency range slightly while also reducing the downlink power level slightly.

Adjustment of one or more of the downlink power level of the transmission signal 106a and/or 106b and the downlink frequency range of downlink transmission signal 106a and/or 106b based on the uplink frequency spectrum of the interfering signal identified in action 761 and the uplink power level of the interfering signal determined in action 762, in response to determining that that the interfering signal is caused by PIM, may be performed by interference mitigation software code 646, executed by hardware processor 642 of device 540/640, and using REC 216/516.

In some implementations, flowchart 470 may conclude with action 764 described above. However, in other implementations, flowchart 760 may continue with determining whether the interfering signal is external to FDD wireless network 100 (action 765). For example, and as discussed above, in addition to PIM, another source of wireless network interference may be narrowband CW signals. Such narrowband CW signals may originate from transmitters external to FDD wireless network 100, i.e., from foreign transmitters. Determination that the interfering signal is a narrowband CW signal external to wireless network 100 may be performed by interference mitigation software code 646, executed by hardware processor 642 of device 540/640, and using interference analyzer 530.

Flowchart 760 may then further continue with, in response to determining that the interfering signal is external to FDD wireless network 100, selectively scheduling uplink transmissions to avoid the interfering signal (action 766). One solution for mitigating narrowband CW interference is disclosed in U.S. Pat. No. 9,479,268, titled "Filtering Interference in Wireless Networks", and issued on Oct. 25, 2016, which is hereby incorporated fully by reference into the present application. Action 766 may be performed by interference mitigation software code 646, executed by hardware processor 642 of device 540/640, and using interference analyzer 530 and the solution disclosed by U.S. Pat. No. 9,479,268.

In some cases, a source of wireless network interference may be a narrowband sweeping signal external to FDD wireless network 100, such as a narrowband signal having a time varying bandwidth. In those cases, the method outlined by flowchart 760 may further include determining, in response to determining that the interfering signal is external to FDD network 100, whether the frequency spectrum of the interfering signal changes as a function of time. Such a determination may be made by interference mitigation software code 646, executed by hardware processor 642 of device 540/640, and using interference analyzer 530.

Moreover, and in response to determining that the frequency spectrum of the interfering signal does change as a function of time, hardware processor 642 of device 540/640 may further execute interference mitigation software code 646 to utilize interference analyzer 530 to identify the rate of change with respect to time of the frequency spectrum of the interfering signal. The narrowband sweeping signal interference external to FDD wireless network 100 may then be mitigated by selectively scheduling uplink transmissions to avoid the interfering signal based on the rate of change with respect to time of the frequency spectrum of the interfering signal. Such selective scheduling of uplink transmissions may be performed by interference mitigation software code 646, executed by hardware processor 642 of device 540/640, and using REC 216/516 including scheduler 218/518.

It is noted that in some use cases, it may be advantageous or desirable to utilize other mitigation techniques, either in addition to or as one or more alternatives to the mitigation solution outlined by flowchart 470. For example, and as discussed above, the CI may be utilized to avoid interference between PIM and PRACH communications. As another interference mitigation technique, uplink transmissions may be scheduled at edges of the uplink frequency range to avoid PIM, or at other specific frequencies to avoid narrow-bank CW or sweeping interference signals. As yet another interference mitigation technique, difficult transmissions, i.e., those from UE that are far away, may be scheduled to occur during low-PIM 4G LTE subframes or 5G slots with reduced bandwidth or no downlink transmissions.

Thus, the present application discloses devices and methods for automating interference mitigation in FDD wireless networks that advantageously include the real-time detection, measurement, and mitigation of PIM, as well as interference from other sources. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use in a frequency division duplex (FDD) wireless network including a base station (BS) and a user equipment (UE) being in communication through a medium having an uplink communication channel supporting uplink data communications from the UE to the BS, and a downlink communication channel supporting downlink data communications from the BS to the UE, the method comprising:
   identifying an uplink frequency spectrum in the uplink communication channel being affected by an interfering signal;
   determining an uplink power level of the interfering signal in the uplink communication channel;
   determining whether the interfering signal is caused by a passive intermodulation distortion (PIM);
   in response to determining that that the interfering signal is caused by the PIM, adjusting, based on the identified uplink frequency spectrum and the determined uplink power level of the interfering signal, at least one of a downlink power level of downlink signals being transmitted in the downlink communication channel and a downlink frequency range of the downlink signals transmitted in the downlink communication channel;
   determining whether the interfering signal is external to the FDD wireless network;
   in response to determining that the interfering signal is external to the FDD wireless network, determining whether a frequency spectrum of the interfering signal changes as a function of time;
   in response to determining that the frequency spectrum of the interfering signal changes as a function of time, identifying a rate of change with respect to time of the frequency spectrum of the interfering signal; and
   selectively scheduling uplink transmissions to avoid the interfering signal based on the rate of change with respect to time of the frequency spectrum of the interfering signal.

2. The method of claim 1 further comprises:
   in response to determining that that the interfering signal is caused by the PIM, scheduling no downlink signal transmission during a plurality of intermittent time intervals.

3. The method of claim 1, wherein the FDD wireless network comprises a fourth generation wireless systems (4G) technology network utilizing a Long-Term Evolution (LTE) standard, and wherein the method further comprises:
   in response to determining that that the interfering signal is caused by the PIM, scheduling no downlink signal transmission during some LTE downlink subframes.

4. The method of claim 1, wherein the FDD wireless network comprises a fifth generation wireless systems (5G) technology network, and wherein the method further comprises:
   in response to determining that that the interfering signal is caused by the PIM, scheduling no downlink signal transmission during some slots.

5. The method of claim 1, wherein the adjusting comprises reducing a number of downlink transmission resource blocks used by the BS to transmit the downlink signals.

6. The method of claim 1, wherein the adjusting comprises decreasing a power level of some downlink transmission resource blocks used to transmit the downlink signals relative to others of the downlink transmission resource blocks.

7. The method of claim 1, wherein the adjusting comprises turning off at least one downlink transmission resource block.

8. The method of claim 1, wherein identifying the uplink frequency spectrum in the uplink communication channel being affected by the interfering signal is based on in-phase (I) and quadrature phase (Q) components within a receiver of the BS.

9. The method of claim 1, wherein the adjusting is performed prior to the determining whether the interfering signal is caused by the PIM.

10. The method of claim 1, further comprising using a configuration index (CI) of an uplink physical random access channel (PRACH) of the FDD wireless network to avoid interference between the PIM and the uplink PRACH.

11. The method of claim 1, further comprising scheduling uplink transmissions at an edge frequency of an uplink frequency range in the uplink communication channel.

12. The method of claim 1, further comprising scheduling uplink transmissions from a remote UE during one of a low-PIM 4G LTE subframe and a low-PIM 5G slot.

13. A method for use in a frequency division duplex (FDD) wireless network including a base station (BS) and a user equipment (UE) being in communication through a medium having an uplink communication channel supporting uplink data communications from the UE to the BS, and a downlink communication channel supporting downlink data communications from the BS to the UE, the method comprising:
- identifying an uplink frequency spectrum in the uplink communication channel being affected by an interfering signal;
- determining whether the interfering signal is external to the FDD wireless network;
- in response to determining that the interfering signal is external to the FDD wireless network, determining whether a frequency spectrum of the interfering signal changes as a function of time;
- in response to determining that the frequency spectrum of the interfering signal changes as a function of time, identifying a rate of change with respect to time of the frequency spectrum of the interfering signal; and
- selectively scheduling uplink transmissions to avoid the interfering signal based on the rate of change with respect to time of the frequency spectrum of the interfering signal.

14. The method of claim 13 further comprises:
- in response to determining that the interfering signal is external to the FDD wireless network, scheduling no downlink signal transmission during a plurality of intermittent time intervals.

15. The method of claim 13, wherein the FDD wireless network comprises a fourth generation wireless systems (4G) technology network utilizing a Long-Term Evolution (LTE) standard, and wherein the method further comprises:
- in response to determining that the interfering signal is external to the FDD wireless network, scheduling no downlink signal transmission during some LTE downlink subframes.

16. The method of claim 13, wherein the FDD wireless network comprises a fifth generation wireless systems (5G) technology network, and wherein the method further comprises:
- in response to determining that the interfering signal is external to the FDD wireless network, scheduling no downlink signal transmission during some slots.

17. The method of claim 13, wherein identifying the uplink frequency spectrum in the uplink communication channel being affected by the interfering signal is based on in-phase (I) and quadrature phase (Q) components within a receiver of the BS.

18. The method of claim 13, further comprising:
- scheduling uplink transmissions at an edge frequency of an uplink frequency range in the uplink communication channel.

19. A device for use in a frequency division duplex (FDD) wireless network including a base station (BS) and a user equipment (UE) being in communication through a medium having an uplink communication channel supporting uplink data communications from the UE to the BS, and a downlink communication channel supporting downlink data communications from the BS to the UE, the device comprising:
- a hardware processor configured to:
  - identify an uplink frequency spectrum in the uplink communication channel being affected by an interfering signal;
  - determine whether the interfering signal is external to the FDD wireless network;
  - in response to determining that the interfering signal is external to the FDD wireless network, determine whether a frequency spectrum of the interfering signal changes as a function of time;
  - in response to determining that the frequency spectrum of the interfering signal changes as a function of time, identify a rate of change with respect to time of the frequency spectrum of the interfering signal; and
  - selectively schedule uplink transmissions to avoid the interfering signal based on the rate of change with respect to time of the frequency spectrum of the interfering signal.

20. The device of claim 19, wherein the hardware processor is further configured to:
- in response to determining that the interfering signal is external to the FDD wireless network, schedule no downlink signal transmission during a plurality of intermittent time intervals.

21. The device of claim 19, wherein the FDD wireless network comprises a fourth generation wireless systems (4G) technology network utilizing a Long-Term Evolution (LTE) standard, and wherein the hardware processor is further configured to:
- in response to determining that the interfering signal is external to the FDD wireless network, schedule no downlink signal transmission during some LTE downlink subframes.

22. The device of claim 19, wherein the FDD wireless network comprises a fifth generation wireless systems (5G) technology network, and wherein the hardware processor is further configured to:
- in response to determining that the interfering signal is external to the FDD wireless network, schedule no downlink signal transmission during some slots.

23. The device of claim 19, wherein identifying the uplink frequency spectrum in the uplink communication channel being affected by the interfering signal is based on in-phase (I) and quadrature phase (Q) components within a receiver of the BS.

24. The device of claim 19, wherein the hardware processor is further configured to:
- schedule uplink transmissions at an edge frequency of an uplink frequency range in the uplink communication channel.

* * * * *